US008102762B2

(12) United States Patent
Oyama et al.

(10) Patent No.: US 8,102,762 B2
(45) Date of Patent: Jan. 24, 2012

(54) COMMUNICATION CONTROL SYSTEM AND COMMUNICATION CONTROL METHOD

(75) Inventors: Hiroki Oyama, Tokyo (JP); Tomoki Murakami, Tokyo (JP); Hiroshi Kurihara, Tokyo (JP); Yoshiki Shioji, Tokyo (JP); Atsushi Hashiguchi, Tokyo (JP); Keisuke Daikohara, Tokyo (JP); Yasuhiko Sakaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 217 days.

(21) Appl. No.: 12/478,958

(22) Filed: Jun. 5, 2009

(65) Prior Publication Data

US 2009/0303992 A1 Dec. 10, 2009

(30) Foreign Application Priority Data

Jun. 5, 2008 (JP) .................. 2008-148149

(51) Int. Cl.
  *G01R 31/08* (2006.01)
(52) U.S. Cl. ...................... 370/229; 370/389
(58) Field of Classification Search .............. None
  See application file for complete search history.

(56) References Cited

U.S. PATENT DOCUMENTS

| | | | | |
|---|---|---|---|---|
| 7,394,811 B2 * | 7/2008 | Gibson et al. | ........ | 370/392 |
| 7,480,305 B1 * | 1/2009 | Somasundaram | ........ | 370/401 |
| 2005/0047423 A1 * | 3/2005 | Kaul et al. | ........ | 370/401 |
| 2007/0169144 A1 | 7/2007 | Chen et al. | | |
| 2009/0303992 A1 * | 12/2009 | Oyama et al. | ........ | 370/389 |

FOREIGN PATENT DOCUMENTS

| | | | |
|---|---|---|---|
| JP | 2008104002 A | 5/2008 | |
| WO | 2006045402 A | 5/2006 | |

OTHER PUBLICATIONS

European Search Report for EP 09 07 5255 completed Nov. 11, 2009.
H. Tschofenig, et al., "SIP SAML Profile and Binding draft-ietf-sip-saml-03.txt", IETF Standard-Working-draft, Internet Engineering Task Force, IETF. Nov. 18, 2007, XP015053909, pp. 1-43.

* cited by examiner

*Primary Examiner* — Robert Wilson

(57) ABSTRACT

A system, which is connectable to a first apparatus capable of data communication using a data communication protocol via a network where each session is managed by a session management protocol, includes: a connecting section which, if ID about the first apparatus exists in a storing section when a start instruction is received from the first apparatus, registers ID about a session corresponding to the start instruction in association with the ID about the first apparatus, and establishes a path enabling data communication for the first apparatus in the network using the session management protocol; and a providing section which, upon receiving the ID about the session from a second apparatus, transmits confirmation information according to the result of confirmation about whether the ID about the first apparatus is in association with the ID about the session.

10 Claims, 10 Drawing Sheets

Fig.2

1a NACF

| SUBSCRIBER USER ID | IP ADDRESS |
|---|---|
| AAAAA | ○○○ |
| BBBBB | △△△ |
| ⋮ | ⋮ |

Fig.3

1c CSCF

| IP ADDRESS |
|---|
| ○○○ |
| △△△ |
| ⋮ |

Fig.4

1d MANAGING SECTION

| USER INFORMATION 1d1 | | PROVIDER ID 1d2 | ACCESS KEY 1d3 |
|---|---|---|---|
| ATTRIBUTE INFORMATION 1d1a | TELEPHONE NUMBER 1d1b | | |
| ○×,△,□ | aaaa | | 1111 |
| △× | bbbb | xxx | 1111 |
| ⋮ | ⋮ | ⋮ | ⋮ |

Fig.6

1e CONNECTING SECTION

| INCOMING AND OUTGOING TELEPHONE NUMBERS | | IP ADDRESS OF HOME GATEWAY (OUTGOING SIDE) | ACCESS KEY |
|---|---|---|---|
| OUTGOING-SIDE TELEPHONE NUMBER | INCOMING-SIDE TELEPHONE NUMBER | | |
| aaaa | bbbb | ○○○ | 1111 |
| ⋮ | ⋮ | ⋮ | ⋮ |

Fig.7

1e CONNECTING SECTION

| IP ADDRESS AND PORT NUMBER BEFORE CONVERSION | IP ADDRESS AND PORT NUMBER AFTER CONVERSION |
|---|---|
| ○○○, □□□○ | □○△, □○□○ |
| ⋮ | ⋮ |

Fig.9

1f PROVIDING SECTION

| PROVIDER ID | IDENTIFICATION INFORMATION ABOUT WEB SERVER | POLICY (ITEM TO BE NOTIFIED) |
|---|---|---|
| XXX | △△△ | NAME, SEX |
| ⋮ | ⋮ | ⋮ |

| USER ID | POLICY (ITEM TO BE NOTIFIED) |
|---|---|
| AAAAA | SEX |
| ⋮ | ⋮ |

# COMMUNICATION CONTROL SYSTEM AND COMMUNICATION CONTROL METHOD

This application is based upon and claims the benefit of priority from Japanese patent application No. 2008-148149, filed on Jun. 5, 2008, the disclosure of which is incorporated herein in its entirety by reference.

BACKGROUND OF THE INVENTION

1. Field of the Invention

The present invention relates to a communication control system and a communication control method, and in particular to a communication control system and a communication control method in a communication network where a session is managed with the use of a session management protocol.

2. Description of the Related Art

Japanese Patent Laid-Open No. 2008-104002 describes an NGN (Next Generation Network) as a communication network utilizing IP (Internet Protocol) technology.

In an NGN, a session management protocol like SIP (Session Initiation Protocol) is used in addition to a data communication protocol like HTTP (Hyper Text Transport Protocol). For example, securing QoS (Quality of Service) and line authentication are performed as session management, It is conceivable that a server apparatus connects to a session management communication network in which session management is performed, like the NGN, via a non-session-management communication network in which session management is not performed, like the Internet, and after that, the server apparatus communicates with a terminal apparatus connected to the session management communication network.

In this case, a problem occurs in which the server apparatus cannot confirm whether the communication-counterpart terminal apparatus is a communication apparatus operated by a user under contract to use the session management communication network.

SUMMARY OF THE INVENTION

An exemplary object of the present invention is to provide a communication control system and a communication control method capable of solving the above problem.

A communication control system of an embodiment of the invention includes a connecting unit, a managing unit, and a providing unit. The connecting unit establishes a connection to a first communication apparatus carrying out data communication using a predetermined data communication protocol via a communication network in which a session is managed according to a predetermined session management protocol. The managing unit manages a storing unit storing first identification information about the first communication apparatus used by a user who is authorized to use the communication network. The providing unit carries out data communication unit with a second communication apparatus using the predetermined data communication protocol via the communication network. When the managing unit receives a session start instruction from the first communication apparatus, the managing unit assigns second identification information about a session corresponding to the session start instruction if the first identification information in the session start instruction is stored in the storing unit. The connecting unit associates the second identification information that is assigned by the managing unit with the first identification information, registers the first and second identification information in the connecting unit, and establishes a communication path to the first communication apparatus in accordance with the session start instruction. When the providing unit receives the second identification information from the second communication apparatus, the providing unit confirms whether the first identification information that is associated with the second identification information is registered in the connecting unit, and notifies the second communication apparatus if the first identification information that is associated with the second identification information is registered in the connecting unit.

A communication control method of an embodiment of the invention establishes a connection to a first communication apparatus carrying out data communication, using a predetermined data communication protocol, and via a communication network, where a session is managed by a predetermined session management protocol. The method manages a storing unit storing first identification information about the first communication apparatus used by a user who is authorized to use the communication network. The method carries out data communication with a second communication apparatus using the predetermined data communication protocol via the communication network. The method includes, when receiving a session start instruction from the first communication apparatus, assigning second identification information about a session corresponding to the session start instruction if the first identification information in the session start instruction is stored in the storing unit. The method includes associating the second identification information with the first identification information, and registering the first and second identification information in a connecting unit. The method includes establishing a communication path to the first communication apparatus in accordance with the session start instruction. The method includes, when receiving the second identification information from the second communication apparatus, confirming whether the first identification information associated with the second identification information is registered in the connecting unit. The method includes notifying the second communication apparatus if the first identification information associated with the second identification information is registered in the connecting unit.

BRIEF DESCRIPTION OF THE DRAWINGS

FIG. 2 is a diagram showing an example of information stored in NACF 1*a*;

FIG. 3 is a diagram showing an example of information registered with CSCF 1*c*;

FIG. 4 is a diagram showing an example of information registered with managing section 1*d*;

FIG. 6 is a diagram showing an example of incoming and outgoing telephone numbers, the IP address of home gateway 3, and an access key which are held by connecting section 1*e*;

FIG. 7 is a diagram showing an example of IP addresses and port numbers before and after NAT conversion which are held by connecting section 1*e*;

FIG. 9 is a diagram showing an example of information stored in providing section 1*f*;

DETAILED DESCRIPTION OF EXEMPLARY EMBODIMENT(S)

Exemplary embodiments will be described below with reference to drawings.

First Exemplary Embodiment

Figure 1:
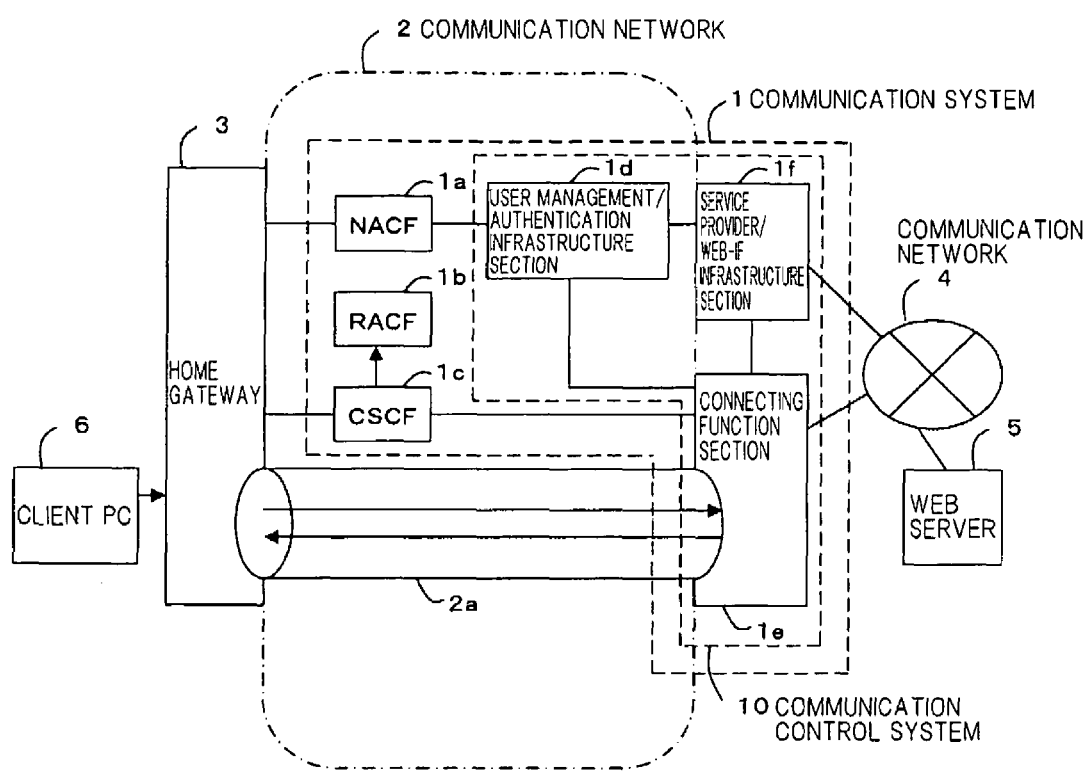
FIG. 1 is a block diagram showing a communication system using a communication control system of a first exemplary embodiment.

FIG. 1 is a block diagram showing a communication system using a communication control system of a first exemplary embodiment.

In FIG. 1, communication system 1 includes NACF (Network Attachment Control Function) 1a, RACF (Resource and Admission Control Function) 1b, CSCF (Call/Session Control Function) 1c, user management/authentication infrastructure section (hereinafter referred to as "managing section") 1d, connecting function section (hereinafter referred to as "connecting section") 1e, and service provider/Web-IF (Interface) infrastructure section (hereinafter referred to as "providing section") 1f.

NACF 1a, RACF 1b, CSCF 1c, managing section 1d, connecting section 1e and providing section 1f may be configured by separate apparatuses or may be included in one apparatus. Some of them may be included in one apparatus.

Managing section 1d, connecting section 1e and providing section 1f are included in communication control system 10.

Communication control system 10 is connectable to home gateway 3 via communication network 2. Home gateway 3 can perform data communication using HTTP. Communication control system 10 is also connected to WEB server 5 via communication network 4. WEB server 5 can perform data communication using HTTP. Home gateway 3 is connected to client PC (Personal Computer) 6. Home gateway 3 and client PC 6 are used by the same user.

In communication network 2, a session is managed with the use of SIP. For example, securing QoS and line authentication are performed as session management. SIP can be generically called a predetermined session management protocol.

In communication network 2, a communication path for HTTP is established with the use of SIP. HTTP can be generically called a predetermined session management protocol.

Communication network 4 is, for example, the Internet. In communication network 4, session management is not performed, and data communication using HTTP can be performed.

NACF 1a can be generically called storing means.

NACF 1a performs authentication of a user ID and assignment of an IP address to home gateway 3.

The ID (hereinafter referred to as a "subscriber user ID") of a user authorized to use communication network 2 (for example, a user who entered into a contract to use communication network 2) is registered with NACF 1a in advance.

Upon receiving a user ID from any apparatus, NACF 1a confirms whether the user ID is registered as a subscriber user ID. If the user ID is registered as a subscriber user ID, NACF 1a assigns an IP address to the subscriber user ID and registers the IP address in association with the subscriber user ID.

Therefore, NACF 1a stores the IP address of an apparatus used by a user who is authorized to use communication network 2. The IP address stored in NACF 1a can be generically called identification information about an apparatus used by a user who is authorized to use communication network 2. Thus, NACF 1a transmits the IP address to the user ID transmission source (the apparatus used by the user authorized to use communication network 2).

FIG. 2 is a diagram showing an example of the information stored in NACF 1a.

RACF 1b interprets a QoS request, performs resource management and controls a transport apparatus not shown.

Identification information about an apparatus which uses a user ID authenticated by NACF 1a, that is, identification about an apparatus permitted to perform communication using communication network 2 (specifically, an IP address assigned to the apparatus) is registered with CSCF 1c.

FIG. 3 is a diagram showing an example of information registered with CSCF 1c.

NACF 1a, RACF 1b and CSCF 1c are well-known techniques.

Managing section 1d can be generically called managing means.

If the IP address of home gateway 3 is stored in NACF 1a when a session start instruction is transmitted from home gateway 3, managing section 1d registers identification information about a session to be started in accordance with the session start instruction, in association with user information about home gateway 3 registered in advance.

In this exemplary embodiment, managing section 1d uses an access key for identifying a session as the identification information about the session.

FIG. 4 is a diagram showing an example of information registered with managing section 1d.

In FIG. 4, user information 1d1, provider ID 1d2 and access key 1d3 are registered with managing section 1d in association with one another.

User information 1d1 includes user attribute information (such as name, age, sex and address) 1d1a and a telephone number (the telephone number of home gateway 3) 1d1b. The provider ID is registered if the user is a provider.

Managing section 1d transmits an access key to connecting section 1e.

Connecting section 1e can be generically called connecting means.

If the IP address of home gateway 3 is stored in NACF 1a when connecting section 1e receives the session start instruction transmitted from home gateway 3, connecting section 1e registers identification information about a session to be started in accordance with the session start instruction, that is, an access key with connecting section 1e itself in association with the IP address of home gateway 3.

Next, connecting section 1e establishes communication path 2a enabling data communication using HTTP to be performed with home gateway 3, in communication network 2 using SIP.

Connecting section 1e controls communication between home gateway 3 and WEB server 5 using communication path 2a.

Upon receiving an access key from managing section 1d, connecting section 1e transmits the access key to home gateway 3. Upon receiving the access key from connecting section 1e, home gateway 3 transmits a request to which the access key is added as an HTTP-specific header, to WEB server 5 using communication path 2a. By receiving the request to which the access key is added as the HTTP-specific header from home gateway 3, WEB server 5 obtains the access key.

Providing section 1f can be generically called providing means.

Upon receiving, from WEB server 5 which has obtained the access key, the access key, providing section 1f confirms whether the IP address of home gateway 3 is registered with connecting section 1e in association with the access key. After that, providing section 1f transmits confirmation information according to the result of the confirmation, to WEB server 5.

If the IP address of home gateway 3 is registered with connecting section 1e in association with the access key, providing section 1f acquires user information about home gateway 3 associated with the access key from managing section 1d. Providing section 1f transmits the user information to WEB server 5 as confirmation information.

For example, providing section 1f stores, in advance, a selection condition for selecting user information to be transmitted to WEB server 5, selects user information to be provided from the user information about home gateway 3 on the basis of the selection condition, and transmits the user information to be provided to WEB server 5 as the confirmation information.

The selection condition is set by the user of home gateway 3, the user (provider) of WEB server 5, or the user of home gateway 3 and the user (provider) of WEB server 5.

Home gateway 3 can be generically called a first communication apparatus.

In home gateway 3, the user ID of home gateway 3 is stored.

Home gateway 3 transmits the user ID to NACF 1a. Home gateway 3 receives an IP address which is transmitted when NACF 1a authenticates the user ID.

Upon receiving the IP address from NACF 1a, home gateway 3 registers the IP address with CSCF 1c.

Upon receiving access to WEB server 5, specifically the URL of WEB server 5, from client PC 6, home gateway 3 converts the URL to the IP address of WEB server 5 and, after that, transmits at least the IP address of home gateway 3 and a SIP session start instruction to CSCF 1c. The SIP session start instruction can be generically called a session start instruction.

Upon receiving the IP address of home gateway 3 and the SIP session start instruction, CSCF 1c confirms whether the IP address of home gateway 3 is registered in advance.

If the IP address of home gateway 3 is registered in advance, CSCF 1c transmits the IP address of home gateway 3 and the SIP session start instruction to connecting section 1e and requests band reservation from RACF 1b.

WEB server 5 can be generically called a second communication apparatus. WEB server 5 is capable of performing data communication using HTTP.

Next, the operation will be described.

Figure 5:
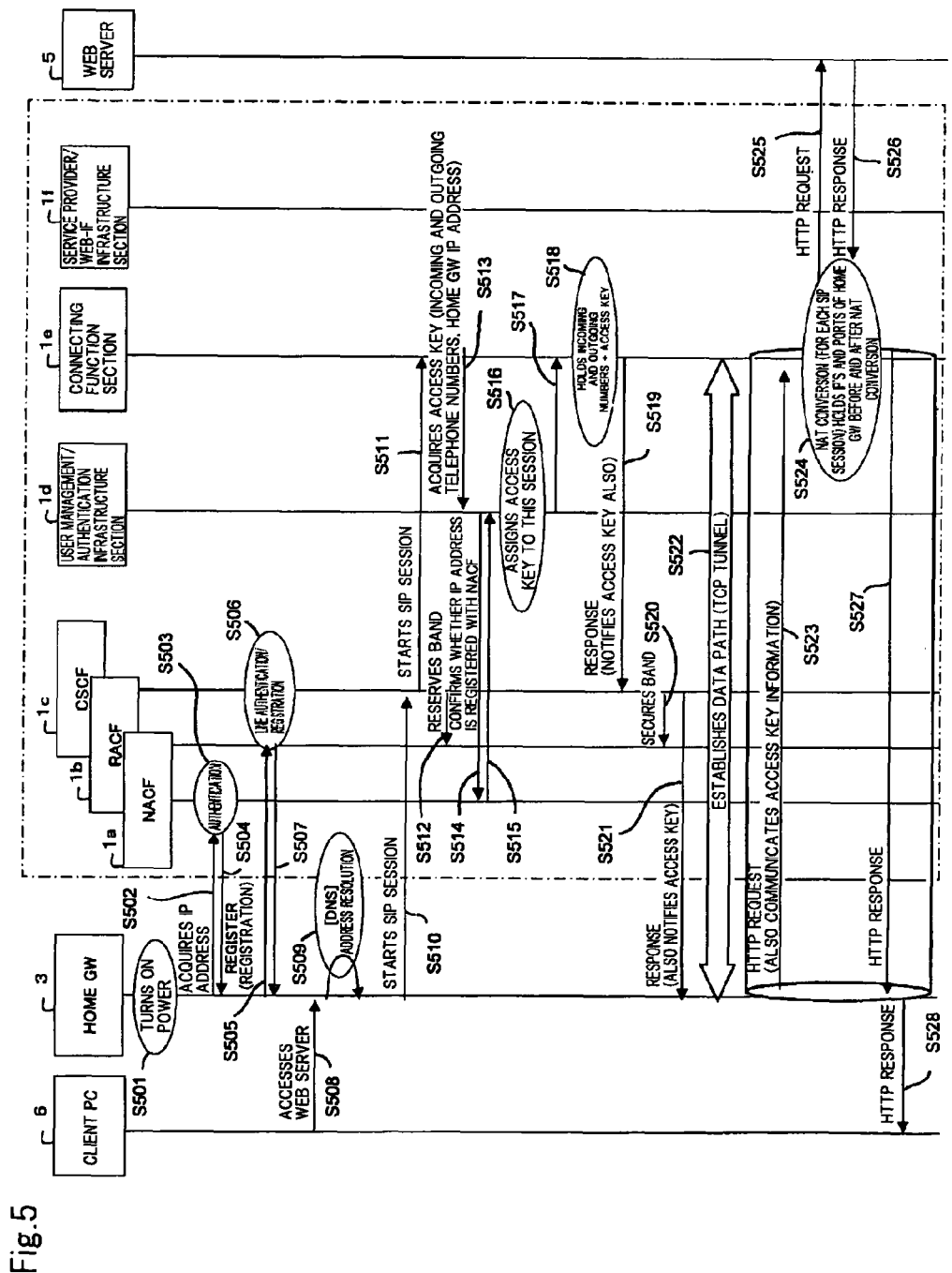
FIG. 5 is a sequence diagram for illustrating the operation of this exemplary embodiment.

FIG. 5 is a sequence diagram for illustrating the operation of this exemplary embodiment. In FIG. 5, the same components as shown in FIG. 1 are given the same reference numerals.

It is assumed that the user of home gateway 3 has entered into a contract to use communication network 2, with the provider of communication network 2, and that the user ID of the user of home gateway 3 is registered with NACF 1a.

When power is turned on, home gateway 3 transmits the user ID to NACF 1a using SIP (steps 501 and 502).

Upon receiving the user ID from home gateway 3, NACF 1a confirms whether the user ID is registered as a subscriber user ID. If the user ID is registered as a subscriber user ID, NACF 1a assigns an IP address to the subscriber user ID and registers the IP address in association with the subscriber user ID (step 503).

After that, NACF 1a transmits the IP address to home gateway 3 using SIP (step 504).

Upon receiving the IP address from NACF 1a, home gateway 3 transmits the IP address to CSCF 1c using SIP (step 505).

Upon receiving the IP address, CSCF 1c registers the IP address (step 506). This registration is referred to as line authentication registration.

Upon ending the line authentication registration, CSCF 1c transmits a line authentication registration completion notification to home gateway 3 using SIP (step 507).

After that, upon receiving the URL of WEB server 5 from client PC 6 (step 508), home gateway 3 converts the URL to the IP address of WEB server 5 (step 509). Home gateway 3 holds the IP address of WEB server 5.

After that, home gateway 3 transmits the IP address of home gateway 3, a SIP session start instruction and the telephone number of home gateway 3 to CSCF 1c using SIP (step 510).

Upon receiving the IP address of home gateway 3, the SIP session start instruction and the telephone number of home gateway 3, CSCF 1c confirms whether the IP address of home gateway 3 is registered in advance.

If the IP address of home gateway 3 is registered in advance, CSCF 1c transmits the IP address of home gateway 3, the SIP session start instruction and the telephone number of home gateway 3 to connecting section 1e using SIP (step 511).

Next, CSCF 1c requests band reservation from RACF 1b using SIP (step 512). Upon receiving the band reservation request, RACF 1b reserves a band to be used for this session. By this band reservation, it is possible to perform a session for which QoS is assured.

Upon receiving the IP address of home gateway 3, the SIP session start instruction and the telephone number of home gateway 3, connecting section 1e transmits the telephone number of home gateway 3, the telephone number of connecting section 1e and the IP address of home gateway 3 to managing section 1d using SIP in order to acquire an access key (step 513). Hereinafter, the combination of the telephone number of home gateway 3 and the telephone number of connecting section 1e will be referred to as incoming and outgoing telephone numbers.

Upon receiving the incoming and outgoing telephone numbers and the IP address of home gateway 3, managing section 1d queries NACF 1a about whether the IP address of home gateway 3 is registered with NACF 1a (step 514).

Upon receiving the query from managing section 1d, NACF 1a confirms whether the IP address of home gateway 3 is registered with NACF 1a. Next, NACF 1a transmits the result of the confirmation to managing section 1d using SIP (step 515).

In this case, the confirmation result indicates that the IP address of home gateway 3 is registered with NACF 1a.

If the confirmation result from NACF 1a indicates that the IP address of home gateway 3 is registered with NACF 1a, managing section 1d assigns an access key to this session.

Next, managing section 1d registers the assigned access key in association with user information about home gateway 3 which is registered in advance (step 516).

Next, managing section 1d transmits the incoming and outgoing telephone numbers and the IP address of home gateway 3, which have been received from connecting section 1e, and the assigned access key to connecting section 1e using SIP (step 517).

Upon receiving the incoming and outgoing telephone numbers, the IP address of home gateway 3 and the access key, connecting section 1e holds the incoming and outgoing telephone numbers, the IP address of home gateway 3 and the access key in association with one another (step 518).

FIG. 6 is a diagram showing an example of the incoming and outgoing telephone numbers, the IP address of home gateway 3 and the access key which are held by connecting section 1e.

Next, connecting section 1e transmits a response to CSCF 1c using SIP in order to establish a communication path enabling data communication using HTTP to be performed with home gateway 3, in communication network 2 (step 519). Connecting section 1e also transmits the access key to CSCF 1c.

Upon accepting the response and the access key from connecting section 1e, CSCF 1c requests band securement from RACF 1b using SIP (step 520). Upon receiving the band securement request, RACF 1b secures the band reserved after step 512 to use it as the communication path to be used for this session.

Next, CSCF 1c transmits the response and the access key to home gateway 3 using SIP (step 521).

Thereby, communication path 2b that enables data communication using HTTP between connecting section 1e and home gateway 3 is established in communication network 2 (step 522).

Upon receiving the response and the access key, home gateway 3 transmits an HTTP request to which the access key is added as an HTTP-specific header, to WEB server 5 using communication path 2a (step 523). In the HTTP request, the port number of home gateway 3 is also shown.

Upon receiving the HTTP request, connecting section 1e performs NAT (Network Address Translation) conversion for the HTTP request to convert the IP address and port number of the HTTP request transmission source to the IP address and port number of connecting section 1e. Connecting section 1e holds the pairs of IP address and port number before and after the NAT conversion in association with each other (step 524).

FIG. 7 is a diagram showing an example of the IP addresses and port numbers before and after the NAT conversion which are held by connecting section 1e.

Connecting section 1e transmits the HTTP request after the NAT conversion to WEB server 5 (step 525).

By receiving the HTTP request to which the access key is added as the HTTP-specific header from home gateway 3 via connecting section 1e, WEB server 5 obtains the access key.

Upon receiving the HTTP request after the NAT conversion, WEB server 5 returns an HTTP response, which is a response to the request, to the transmission source of the HTTP request after the NAT conversion, that is, connecting section 1e (step 526).

Upon receiving the HTTP response, connecting section 1e refers to the pairs of IP addresses and port numbers before and after the NAT conversion, which have been held at step 524, to change the transmission destination of the HTTP response to home gateway 3, and transmits the HTTP response after the change to home gateway 3 using communication path 2a (step 527). In the HTTP response, the IP address and port number of home gateway 3 are shown.

Upon receiving the HTTP response, home gateway 3 transmits the HTTP response to client PC 6 (step 528).

Figure 8:
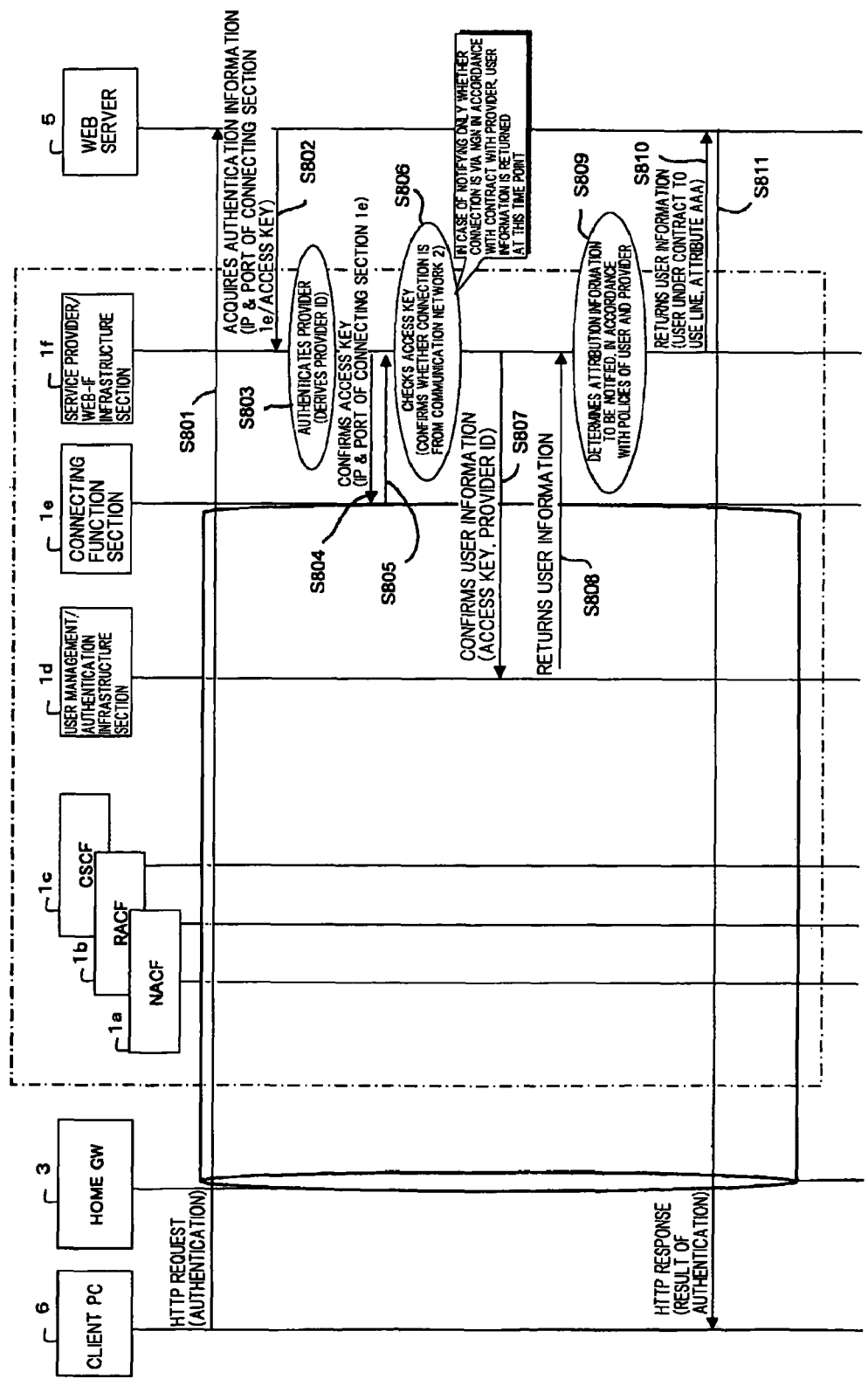
FIG. 8 is a sequence diagram for illustrating the operation of WEB server 5 querying communication control system 10.

FIG. 8 is a sequence diagram for illustrating the operation of WEB server 5 that queries communication control system 10 about whether the user of client PC 6, that is, the user of home gateway 3, is authorized to use communication network 2 upon receiving the HTTP request from client PC 6 via home gateway 3.

In FIG. 8, the same components as shown in FIG. 5 are given the same reference numerals. Connecting section 1e controls communication between home gateway 3 and WEB server 5 by performing the NAT conversion as shown at step 524 in FIG. 5, though it is not shown in FIG. 8.

When confirming whether the transmission source of the HTTP request is a user under contract to use communication network 2 at the time of receiving the HTTP request (step 801), WEB server 5 transmits the IP address and port number of the transmission source shown in the HTTP request (in this case, the IP address and port number of connecting section 1e), an access key and identification information about WEB server 5 to providing section 1f (step 802).

That is, when acquiring authentication information authenticating that the transmission source of an HTTP request is a user under contract to use communication network 2, WEB server 5 transmits transmission source information and an access key shown in the HTTP request and identification information about WEB server 5 to providing section 1f.

In providing section 1f, identification information about WEB server 5 under contract to use communication network 2, the provider ID of WEB server 5, and an item of information (selection condition) to be notified to WEB server 5 are stored in advance in association with one another. Furthermore, in providing section 1f, the user ID of a user under contract to use communication network 2 and an item of information (selection condition) permitted by the user to be notified to a third party are stored in advance in association with each other.

FIG. 9 is a diagram showing an example of the information stored in providing section 1f.

Upon receiving the IP address and port number of connecting section 1e, the access key and the identification about WEB server 5 from WEB server 5, providing section 1f confirms whether or not there is a provider ID associated with the identification information about WEB server 5. If the provider ID associated with the identification information about WEB server 5 exists, providing section 1f authenticates that WEB server 5 is under contract to use communication network 2 (step 803).

If the provider ID associated with the identification information about WEB server 5 does not exist, providing section 1f judges that WEB server 5 is not under contract to use communication network 2 and terminates the operation accompanying receiving of information from WEB server 5.

Upon authenticating WEB server 5, providing section 1f transmits the IP address and port number of connecting section 1e received from WEB server 5 to connecting section 1e in order to confirm whether the access key received from WEB server 5 is true or false (step 804).

Upon receiving the IP address and port number of connecting section 1e from providing section 1f, connecting section 1e first refers to the information held inside (FIG. 7) and converts the IP address and port number to the IP address and port number before conversion (the IP address and port number of home gateway 3).

Next, connecting section 1e refers to the information held inside (FIG. 6) to confirm whether there is an access key associated with the IP address before conversion.

If the access key associated with the IP address before conversion exists, connecting section 1e transmits the access key to providing section 1f. On the other hand, if the access key associated with the IP address before conversion does not exist, connecting section 1e transmits information to the effect that the access key does not exist, to providing section 1f (step 805).

Upon receiving the access key from connecting section 1e, providing section 1f checks the access key against the access key from WEB server 5. If they correspond to each other, providing section 1f judges that the access key from WEB server 5 is true (step 806).

Next, providing section 1f refers to the information stored inside (FIG. 9). If the information item associated with the provider ID identified at step 803 indicates only whether communication network 2 is used or not, providing section 1f transmits the access key judged to be true to WEB server 5 as confirmation information at this time point.

In this case, by receiving the access key transmitted as the confirmation information, WEB server 5 acquires authentication information authenticating that the transmission source of the HTTP request is a user under contract to use communication network 2.

If the information item associated with the provider ID identified at step 803 does not indicate only whether communication network 2 is used or not, providing section 1f transmits the access key and the provider ID to managing section 1d (step 807).

Upon receiving the access key and the provider ID, managing section 1d first refers to the information held inside (FIG. 4) to confirm whether there is user information associated with both the access key and the provider ID.

If the user information associated with both of the access key and the provider ID exists, managing section 1d transmits user information which is associated with the access key but which is not associated with the provider ID, to providing section 1f (step 808).

Upon receiving the user information from managing section 1d, providing section 1f refers to the information stored inside (FIG. 9) to determine attribute information to be notified from among the user information in accordance with information provision policies (items to be notified) of the user and the provider (step 809).

Providing section 1f transmits the determined attribute information to WEB server 5 as confirmation information (step 810).

In this case, by receiving the attribution information about the user transmitted as the confirmation information, WEB server 5 acquires authentication information authenticating that the transmission source of the HTTP request is a user under contract to use communication network 2.

Upon receiving the confirmation information, WEB server 5 transmits an HTTP response to the transmission source of the HTTP request (step 811).

According to this exemplary embodiment, NACF 1a stores an IP address, which is identification information about an apparatus used by a user who is authorized to use communication network 2.

If the IP address of home gateway 3 is stored in NACF 1a when connecting section 1e receives a session start instruction transmitted from home gateway 3, connecting section 1e registers an access key, which is identification information about a session to be started in accordance with the session start instruction, in association with the IP address of home gateway 3.

Therefore, that the IP address of home gateway 3 is registered with connecting section 1e in association with an access key means that a session identified by the access key is performed by an apparatus used by a user who is authorized to use communication network 2.

Upon receiving the access key from WEB server 5, providing section 1f confirms whether the IP address of home gateway 3 is registered with connecting section 1e in association with the access key, and transmits confirmation information according to the result of the confirmation, to WEB server 5.

Thereby, it is possible for WEB server 5 to confirm whether a communication counterpart apparatus is an apparatus operated by a user under contract to use communication network 2, on the basis of confirmation information.

If the communication counterpart apparatus is a communication apparatus operated by a user under contract to use communication network 2, the contract user can be identified by the provider of communication network 2. Therefore, in case of the occurrence of some trouble, the number of options as methods for coping with the trouble increases.

In this exemplary embodiment, if the IP address of home gateway 3 is registered with connecting section 1e in association with an access key, providing section 1f acquires user information about home gateway 3 associated with the access key from managing section 1d, and transmits the user information to WEB server 5 as confirmation information.

In this case, if the communication counterpart apparatus is an apparatus operated by a user under contract to use communication network 2, user information about the communication counterpart is transmitted to WEB server 5.

Thus, in addition to the advantage described above, it is possible for WEB server 5 to obtain information about a communication counterpart on the basis of user information about the communication counterpart. Therefore, it is possible for WEB server 5 to change services to be provided for the communication counterpart on the basis of the information about the communication counterpart.

Therefore, it is possible for WEB server 5 to provide targeted advertisement and request proxy charging by using user information about a communication counterpart.

In this exemplary embodiment, providing section 1f stores a selection condition (see FIG. 9) for selecting user information to be transmitted to WEB server 5 in advance, selects user information to be provided from among user information about home gateway 3 on the basis of the selection condition, and transmits the user information to be provided to WEB server 5 as confirmation information.

In this case, it is possible to limit the information to be transmitted to WEB server 5. Thereby, it is possible to prevent unnecessary information or information that a user and/or provider does not want to be transmitted from being transmitted to WEB server 5.

It is desirable that the selection condition be set by the user of home gateway 3, the user (provider) of WEB server 5, or the user of home gateway 3 and the user (provider) of WEB server 5.

In this case, the user information to be provided is determined on the basis of the policy of the user of home gateway 3 or the policy of the user (provider) of WEB server 5.

In this exemplary embodiment, connecting section 1e transmits an access key to home gateway 3. Upon receiving the access key, home gateway 3 transmits a request to which the access key is added as an HTTP-specific header, to WEB server 5 using communication path 2a. By receiving the request from home gateway 3, WEB server 5 obtains the access key.

In this case, it is possible to provide the access key for WEB server 5 with transmission of an HTTP request.

Second Exemplary Embodiment

Figure 10:
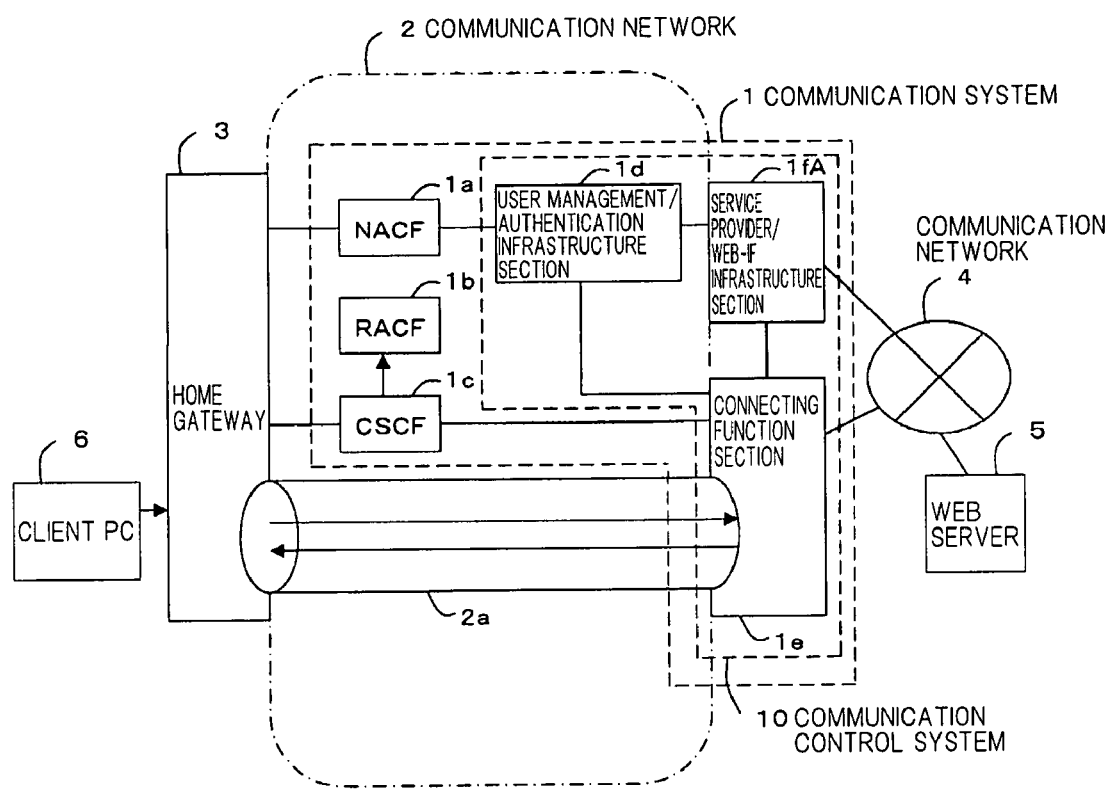
FIG. 10 is a block diagram showing a communication system using a communication control system of a second exemplary embodiment.

FIG. 10 is a block diagram showing a communication system using a communication control system of a second exemplary embodiment. In FIG. 10, the same components as shown in FIG. 1 are given the same reference numerals.

The second exemplary embodiment differs from the first exemplary embodiment in that providing section 1*f*A is provided instead of providing section 1*f* and that an access key is not transmitted from home gateway 3 to WEB server 5.

The second exemplary embodiment will be described by mainly focusing on the points that differ from the first exemplary embodiment.

In FIG. 10, providing section 1*f*A can be generically called providing means.

Upon receiving the related information from WEB server 5 which has obtained related information corresponding to the IP address of home gateway 3 (specifically, the IP address after performing NAT conversion of the IP address of home gateway 3), providing section 1*f*A confirms whether an access key is registered with connecting section 1*e* in association with the IP address of home gateway 3 corresponding to the related information, and transmits confirmation information according to the result of the confirmation to WEB server 5.

For example, if an access key is registered with connecting section 1*e* in association with the IP address of home gateway 3, providing section 1*f*A provides the access key for WEB server 5 as confirmation information.

Upon receiving the access key from WEB server 5, providing section 1*f*A acquires user information about home gateway 3 associated with the access key from managing section 1*d*, and transmits the user information to WEB server 5.

Providing section 1*f*A stores the selection condition (item to be notified) as shown in FIG. 9 in advance, selects user information to be provided from among the user information about home gateway 3 on the basis of the selection condition, and transmits the user information to be provided to WEB server 5.

Figure 11:
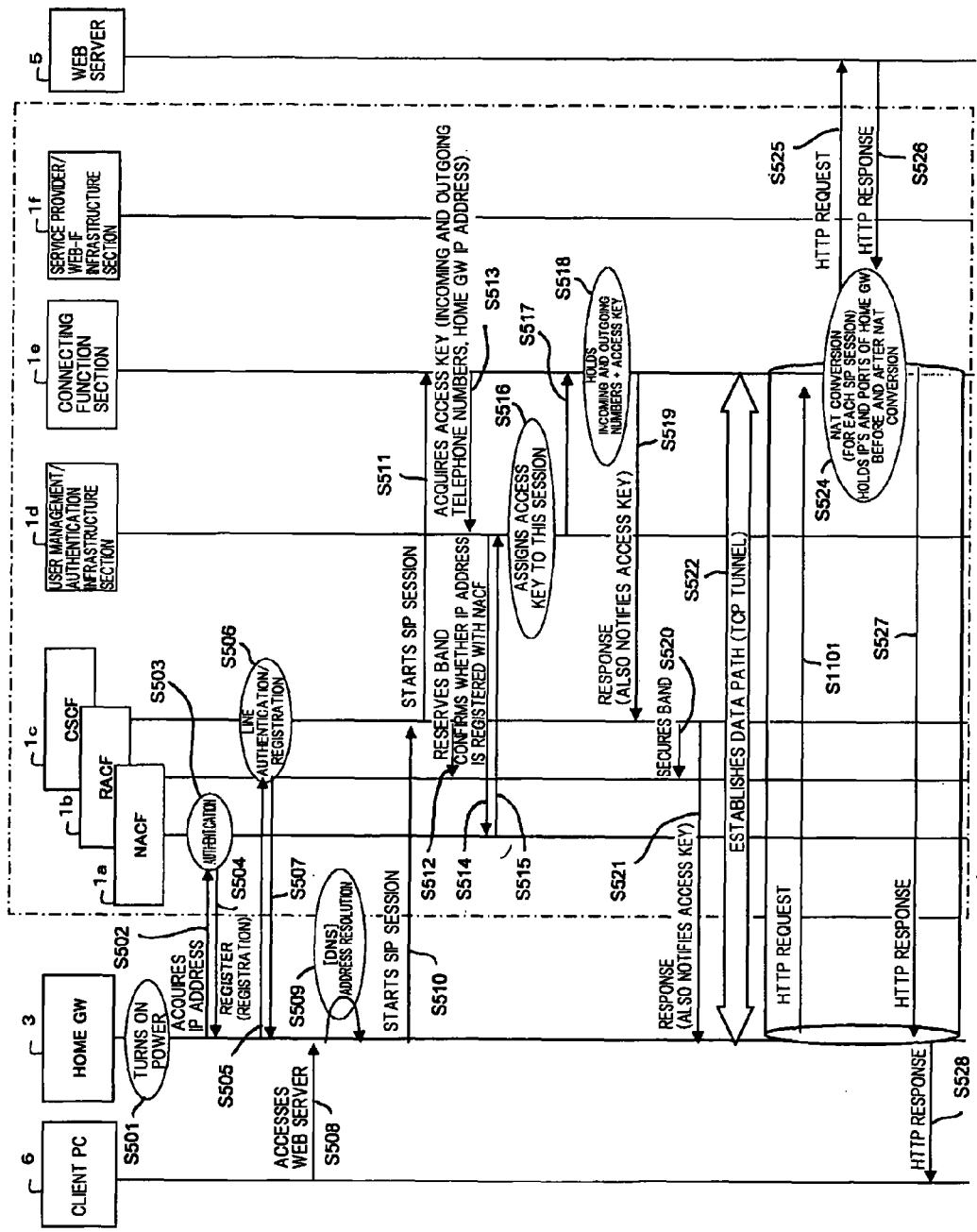
FIG. 11 is a sequence diagram for illustrating the operation of this exemplary embodiment.

FIG. 11 is a sequence diagram for illustrating the operation of this exemplary embodiment.

In FIG. 11, the same processes as shown in FIG. 5 are given the same reference numerals. Points that differ from the processes shown in FIG. 5 will be described below.

In FIG. 11, step 1101 is performed instead of step 523.

At step 1101, upon receiving a response and an access key, home gateway 3 transmits an HTTP request to which the access key is not added as an HTTP-specific header, to WEB server 5 using communication path 2*a*. In the HTTP request, the port number of home gateway 3 is also shown.

Figure 12:
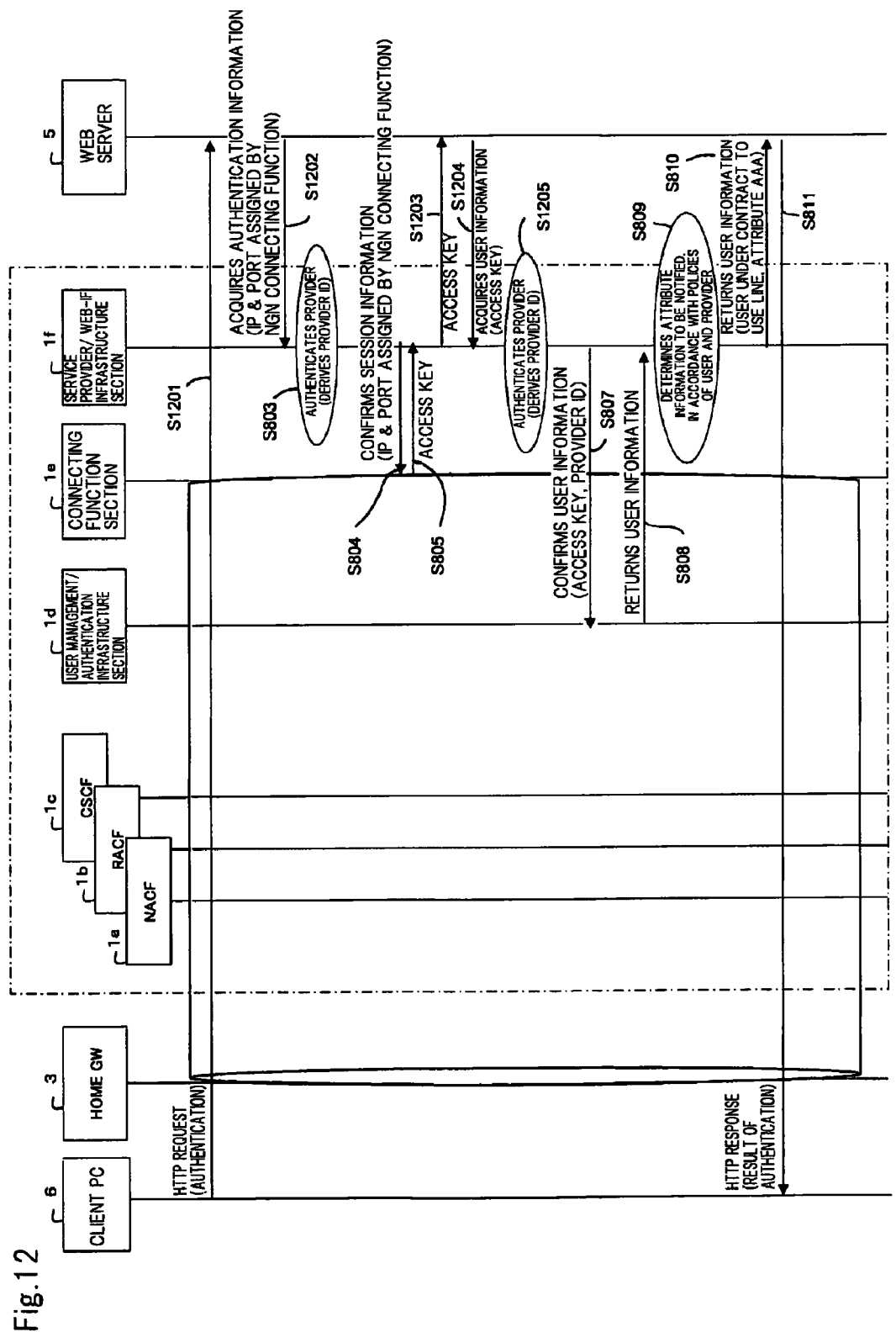
FIG. 12 is a sequence diagram for illustrating the operation of WEB server 5 querying of communication control system 10.

FIG. 12 is a sequence diagram for illustrating the operation of WEB server 5 that queries communication control system 10 about whether the user of client PC 6, that is, the user of home gateway 3, is authorized to use communication network 2 upon receiving the HTTP request from client PC 6 via home gateway 3.

In FIG. 12, the same processes as shown in FIG. 8 are given the same reference numerals. Points that differ from the processes shown in FIG. 8 will be described below.

In FIG. 12, steps 1201 and 1202 are performed instead of steps 801 and 802, and steps 1203 to 1205 are performed instead of step 806.

When confirming whether the transmission source of the HTTP request is a user under contract to use communication network 2 at the time of receiving the HTTP request (step 1201), WEB server 5 transmits the IP address and port number of the transmission source (in this case, the IP address and port number of connecting section 1*e*) shown in the HTTP request, and identification information about WEB server 5 to providing section 1*f*A (step 1202).

Upon receiving the IP address and port number of connecting section 1*e* and the identification information about WEB server 5 from WEB server 5, providing section 1*f*A executes steps 803 and 804, and connecting section 1*e* executes step 805.

Upon receiving the access key from connecting section 1*e*, providing section 1*f*A transmits the access key to WEB server 5 as confirmation information (step 1203).

Upon receiving the access key, WEB server 5 transmits the access key to providing section 1*f*A together with the identification information about WEB server 5 to obtain user information (step 1204).

Upon receiving the access key together with the identification information about WEB server 5, providing section 1*f*A confirms whether or not there is a provider ID associated with the identification information about WEB server 5. If the provider ID associated with the identification information about WEB server 5 exists, providing section 1*f*A authenticates that WEB server 5 is under contract to use communication network 2 (step 1205).

If the provider ID associated with the identification information about WEB server 5 does not exist, providing section 1*f*A judges that WEB server 5 is not under contract to use communication network 2 and terminates the operation that accompanies receiving the information from WEB server 5.

If providing section 1*f*A authenticates WEB server 5, steps 807 to 811 are executed.

According to this exemplary embodiment, communication control system 10 shown in FIG. 10 includes connecting section 1*e* and providing section 1*f*A.

Upon receiving the related information from WEB server 5 which has obtained related information corresponding to the IP address of home gateway 3, providing section 1*f*A confirms whether an access key is registered with connecting section 1*e* in association with the IP address of home gateway 3 corresponding to the related information, and transmits confirmation information according to the result of the confirmation to WEB server 5.

That an access key is registered with connecting section 1*e* in association with the IP address of home gateway 3 means that home gateway 3 is an apparatus used by a user who is authorized to use communication network 2.

Therefore, it is possible for WEB server 5 to authenticate that home gateway 3 is an apparatus used by a user who is authorized to use communication network 2 on the basis of the confirmation information.

Thus, when WEB server 5 authenticates a communication counterpart, the user of home gateway 3 does not have to transmit a user ID and a password.

Thus, according to this exemplary embodiment, it is possible to solve the problem that, when one communication apparatus (WEB server 5) authenticates a communication counterpart (home gateway 3), the user of the communication counterpart has to transmit a user ID and a password.

According to this exemplary embodiment, if an access key is registered with connecting section 1*e* in association with the IP address of home gateway 3, providing section 1*f*A transmits the access key to WEB server 5 as confirmation information.

In this case, when the communication counterpart apparatus is an apparatus operated by a user under contract to use communication network 2, the access key is transmitted to WEB server 5.

Therefore, it is possible for WEB server 5 to authenticate that home gateway 3 is an apparatus used by a user who is authorized to use communication network 2, by receiving the access key.

In this exemplary embodiment, communication control system 10 shown in FIG. 10 further includes connecting section 1e, providing section 1fA and managing section 1d.

Upon receiving the access key from WEB server 5 which has obtained an access key, providing section 1fA acquires user information about home gateway 3 associated with the access key from managing section 1d, and transmits the user information to WEB server 5.

In this case, it is possible for WEB server 5 to obtain information about the communication counterpart on the basis of the user information about the communication counterpart. Therefore, it is possible for WEB server 5 to provide concierge-type services in which services to be provided for a communication counterpart are changed on the basis of information about the communication counterpart.

In this exemplary embodiment, providing section 1fA stores, in advance, a selection condition (see FIG. 9) for selecting user information to be transmitted to WEB server 5, selects user information to be provided from among user information about home gateway 3 on the basis of the selection condition, and transmits the user information to be provided to WEB server 5 as confirmation information.

In this case, it is possible to limit the information to be transmitted to WEB server 5. Thereby, it is possible to prevent unnecessary information or information that the user and/or provider does not want to be transmitted from being transmitted to WEB server 5.

It is desirable that the selection condition be set by the user of home gateway 3, the user (provider) of WEB server 5, or the user of home gateway 3 and the user (provider) of WEB server 5.

In this case, the user information to be provided is determined on the basis of the policy of the user of home gateway 3 or the policy of the user (provider) of WEB server 5.

Furthermore, according to each of the exemplary embodiments described above, upon receiving a SIP session start instruction transmitted from home gateway 3, connecting section 1e establishes communication path 2a that enables data communication using HTTP to be performed with home gateway 3, in communication network 2 using SIP. Connecting section 1e controls communication between home gateway 3 and WEB server 5 using communication path 2a.

Therefore, WEB server 5 does not have to perform session control using SIP when communicating with home gateway 3 via communication network 2.

Thus, according to each of the exemplary embodiments described above, it is possible to solve the problem that, in order to develop an application for connecting to a communication network which requires both a data communication protocol and a session management protocol, a network technique that uses the session management protocol is newly required in addition to a network technique that uses the data communication protocol, and there is a possibility that the network technique using the session management protocol will become a new technical obstacle when developing an application for connection to the management network.

Third Exemplary Embodiment

Figure 13:
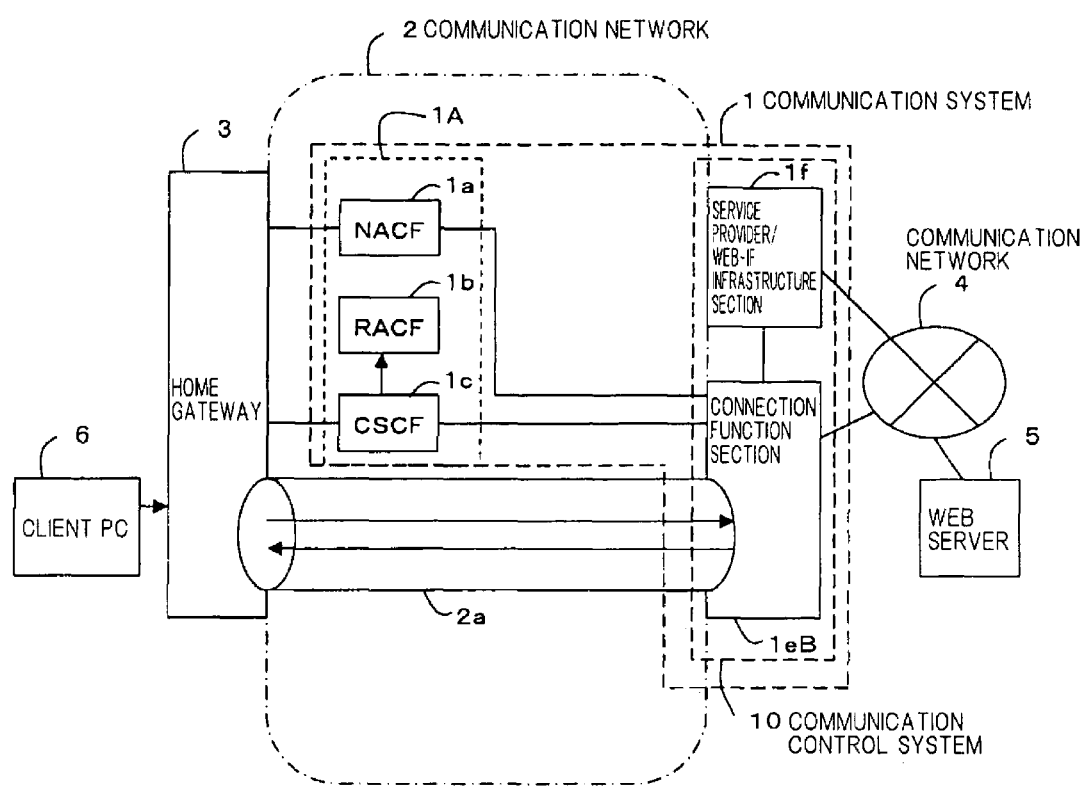
FIG. 13 is a block diagram showing a communication system using a communication control system of a third exemplary embodiment.

FIG. 13 is a block diagram showing a communication system using a communication control system of a third exemplary embodiment. In FIG. 13, components having the same functions as those shown in FIG. 1 are given the same reference numerals.

The third exemplary embodiment differs from the first exemplary embodiment in that managing section 1d is omitted, and connecting section 1eB is used instead of connecting section 1e. NACF 1a, RACF 1b and CSCF 1c comprise storing section 1A which stores identification information about an apparatus used by a user who is authorized to use communication network 2. Storing section 1A can be generically called storing means.

Connecting section 1eB can be generically called connecting means.

If the IP address of home gateway 3 is stored in storing section 1A when connecting section 1eB receives a session start instruction transmitted from home gateway 3, connecting section 1eB registers identification information about a session to be started in accordance with the session start instruction, that is, an access key in association with the IP address of home gateway 3, and establishes communication path 2a in communication network 2 in accordance with the session start instruction using SIP.

Connecting section 1eB controls communication between home gateway 3 and WEB server 5 using communication path 2a.

According to this exemplary embodiment, since communication control system 10 includes connecting section 1eB and providing section 1f, it is possible for WEB server 5 to confirm whether a communication counterpart apparatus is an apparatus operated by a user under contract to use communication network 2, on the basis of confirmation information, similarly to the first exemplary embodiment.

If the communication counterpart apparatus is a communication apparatus operated by a user under contract to use communication network 2, the contract user can be recognized by the provider of communication network 2. Therefore, in case of the occurrence of some trouble, the number of options as methods for coping with the trouble increases.

In each of the exemplary embodiments described above, communication control system 10 includes connecting section 2e (or connecting section 1eB).

If the IP address of home gateway 3 is stored in NACF 1a when connecting section 1e (or connecting section 1eB) receives a session start instruction transmitted from home gateway 3, connecting section 1e (or connecting section 1eB) establishes communication path 2a in communication network 2 using SIP.

In this case, upon receiving a session start instruction from an apparatus used by a user who is authorized to use communication network 2, connecting section 1e (or connecting section 1eB) establishes communication path 2a. Therefore, it is possible to prevent unauthorized use of communication network 2.

In each of the exemplary embodiments described above, SIP is used as the session management protocol. However, the session management protocol is not limited to SIP, and it can be changed appropriately.

Furthermore, in each of the exemplary embodiments described above, HTTP is used as the data communication protocol. However, the data communication protocol is not limited to HTTP, and it can be changed appropriately.

In each of the exemplary embodiments described above, the shown configuration is only an example, and the present invention is not limited to this configuration.

For example, in each of the exemplary embodiments described above, client PC 6 and home gateway 3 are shown as separate apparatuses. However, a communication apparatus (first communication apparatus) in which client PC 6 and home gateway 3 are integrated may be used.

An example of the advantages of the present invention is that it is possible to confirm whether a communication-counterpart communication apparatus is operated by a user under contract to use a session management communication network.

A communication control system of a fifth exemplary embodiment of the invention includes connecting means, storing means, managing means, and providing means. The connecting means is for establishing a connection to a first communication apparatus carrying out data communication using a predetermined data communication protocol via a communication network, where a session is managed by a predetermined session management protocol. The storing means is for storing first identification information about the first communication apparatus used by a user who is authorized to use the communication network. The managing means for managing the storing means. The providing means is for carrying out data communication with a second communication apparatus using the predetermined data communication protocol via the communication network. When the managing means receives a session start instruction from the first communication apparatus, the managing means assigns second identification information about a session corresponding to the session start instruction if the first identification information in the session start instruction is stored in the storing means. The connecting means associates the second identification information assigned by the managing means with the first identification information, registers the first and second identification information in the connecting means, and establishes a communication path to the first communication apparatus in accordance with the session start instruction. When the providing means receives the second identification information from the second communication apparatus, the providing means confirms whether the first identification information associated with the second identification information is registered in the connecting means, and notifies the second communication apparatus if the first identification information associated with the second identification information is registered in the connecting means.

A sixth exemplary embodiment is a communication control method performed by a communication control system which is connectable to a first communication apparatus capable of data communication using a predetermined data communication protocol via a communication network where a session is managed by a predetermined session management protocol and which is connected to a second communication apparatus capable of data communication using the predetermined data communication protocol, the method comprising:

a connecting step in which, when a session start instruction transmitted from the first communication apparatus is received, a communication path that enables predetermined data communication using the predetermined data communication protocol to be performed with the first communication apparatus is established in the communication network using the predetermined session management protocol.

A seventh exemplary embodiment is the communication control method according to the sixth exemplary embodiment, wherein the communication control system is further connected to storing means that stores identification information about an apparatus used by a user who is authorized to use the communication network; and at the connecting step, if identification information about the first communication apparatus is stored in the storing means, when a session start instruction transmitted from the first communication apparatus is received, the communication path is established in the communication network with the use of the predetermined session management protocol.

An eighth exemplary embodiment is a communication control system which is connectable to a first communication apparatus capable of data communication using a predetermined data communication protocol via a communication network where a session is managed by a predetermined session management protocol and which is connected to a second communication apparatus capable of data communication using the predetermined data communication protocol and which is connected to storing means that stores identification information about an apparatus used by a user who is authorized to use the communication network, the communication control system comprising:

connecting means for, if identification information about the first communication apparatus is stored in the storing means, when a session start instruction transmitted from the first communication apparatus is received, registering identification information about a session to be started in accordance with the session start instruction, in association with the identification information about the first communication apparatus, and establishing a communication path that enables data communication using the predetermined data communication protocol to be performed with the first communication apparatus, in the communication network using the predetermined session management protocol in accordance with the session start instruction; and providing means for, upon receiving the related information from the second communication apparatus which has obtained related information corresponding to the identification information about the first communication apparatus, confirming whether identification information about the session is registered with the connecting means in association with the identification information about the first communication apparatus corresponding to the related information, and transmitting confirmation information according to the result of the confirmation, to the second communication apparatus.

A ninth exemplary embodiment is the communication control system according to the eighth exemplary embodiment, wherein, if the identification information about the session is registered with the connecting means in association with the identification information about the first communication apparatus, the providing means transmits the identification information about the session to the second communication apparatus as the confirmation information.

A tenth exemplary embodiment is the communication control system according to the ninth exemplary embodiment, further comprising managing means for, if the identification information about the first communication apparatus is stored in the storing means when the session start instruction is transmitted from the first communication apparatus, registering the identification information about the session in association with user information about the first communication apparatus registered in advance; wherein upon receiving the identification information about the session from the second communication apparatus which has obtained the identification information about the session, the providing means acquires user information about the first communication apparatus associated with the identification information about the session, from the managing means, and transmits the user information about the first communication apparatus to the second communication apparatus.

An eleventh exemplary embodiment is the communication control system according to the tenth exemplary embodiment, wherein the providing means stores, in advance, a selection condition for selecting user information to be transmitted to the second communication apparatus, selects user information to be provided from among user information about the first communication apparatus on the basis of the selection condition, and transmits the user information to be provided to the second communication apparatus.

A twelfth exemplary embodiment is the communication control system according to the eleventh exemplary embodiment, wherein the selection condition is set by a user of the first communication apparatus, a user of the second communication apparatus, or the user of the first communication apparatus and the user of the second communication apparatus.

A thirteenth exemplary embodiment is a communication control method performed by a communication control system which is connectable to a first communication apparatus capable of data communication using a predetermined data communication protocol via a communication network where a session is managed by a predetermined session management protocol and which is connected to a second communication apparatus capable of data communication using the predetermined data communication protocol and connected to storing means that stores identification information about an apparatus used by a user who is authorized to use the communication network, the method comprising:

a connecting step in which, if identification information about the first communication apparatus is stored in the storing means when a session start instruction is transmitted from the first communication apparatus, identification information about a session to be started in accordance with the session start instruction is registered, with connecting means in association with the identification information about the first communication apparatus, and a communication path that enables data communication using the predetermined data communication protocol to be performed with the first communication apparatus is established in the communication network using the predetermined session management protocol in accordance with the session start instruction; and a providing step in which, when related information transmitted from the second communication apparatus which has obtained the related information corresponding to the identification information about the first communication apparatus is received, confirming whether identification information about the session is registered with the connecting means in association with the identification information about the first communication apparatus corresponding to the related information, and confirmation information according to the result of the confirmation is then transmitted to the second communication apparatus.

A fourteenth exemplary embodiment is the communication control method according to the thirteenth exemplary embodiment, wherein, if the identification information about the session is registered with the connecting means in association with the identification information about the first communication apparatus, the providing step transmits the identification information about the session to the second communication apparatus as the confirmation information.

A fifteenth exemplary embodiment is the communication control method according to the fourteenth exemplary embodiment, further comprising a managing step in which, if the identification information about the first communication apparatus is stored in the storing means when the session start instruction is transmitted from the first communication apparatus, the identification information about the session is registered with managing means in association with user information about the first apparatus registered in advance; wherein at the providing step, when identification information about the session transmitted from the second communication apparatus which has obtained the identification information about the session is received, user information about the first communication apparatus associated with the identification information about the session is acquired from the managing means, and the user information about the first communication apparatus is transmitted to the second communication apparatus.

A sixteenth exemplary embodiment is the communication control method according to the fifteenth exemplary embodiment, wherein, at the providing step, user information to be provided is selected from among user information about the first communication apparatus on the basis of a selection condition for selecting user information to be transmitted to the second communication apparatus, and the user information to be provided is transmitted to the second communication apparatus.

A seventeenth exemplary embodiment is the communication control method according to the sixteenth exemplary embodiment, wherein the selection condition is set by a user of the first communication apparatus, a user of the second communication apparatus, or the user of the first communication apparatus and the user of the second communication apparatus. While the invention has been particularly shown and described with reference to exemplary embodiments thereof, the invention is not limited to these exemplary embodiments. It will be understood by those of ordinary skill in the art that various changes in form and details may be made therein without departing from the spirit and scope of the present invention as defined by the claims.

What is claimed is:

1. A communication control system comprising:
a connecting unit that establishes a connection to a first communication apparatus carrying out data communication using a predetermined data communication protocol via a communication network in which a session is managed according to a predetermined session management protocol;
a managing unit that manages a storing unit storing first identification information about the first communication apparatus used by a user who is authorized to use the communication network; and,
a providing unit that carries out data communication unit with a second communication apparatus using the predetermined data communication protocol via the communication network,
wherein when the managing unit receives a session start instruction from the first communication apparatus, the managing unit assigns second identification information about a session corresponding to the session start instruction if the first identification information in the session start instruction is stored in the storing unit,
wherein the connecting unit associates the second identification information that is assigned by the managing unit with the first identification information, registers the first and second identification information in the connecting unit, and establishes a communication path to the first communication apparatus in accordance with the session start instruction,
and wherein when the providing unit receives the second identification information from the second communication apparatus, the providing unit confirms whether the first identification information that is associated with the second identification information is registered in the connecting unit, and notifies the second communication apparatus if the first identification information that is associated with the second identification information is registered in the connecting unit.

2. The communication control system according to claim 1, wherein the managing unit stores user information about the first communication apparatus and associates the second identification information with the user information,
  wherein when the first identification information that is associated with the second identification information is registered in the connecting unit, the providing unit acquires the user information from the managing unit and transmits the user information to the second communication apparatus.

3. The communication control system according to claim 2, wherein the providing unit stores a selection condition for selecting the user information to be transmitted to the second communication apparatus,
  and wherein the providing unit selects the user information to be provided from among the user information in the managing unit, based on the selection condition, and the providing unit transmits to the second communication apparatus the user information to be provided.

4. The communication control system according to claim 3, wherein the selection condition is set by a user of the first communication apparatus, a user of the second communication apparatus, or the user of the first communication apparatus and the user of the second communication apparatus.

5. The communication control system according to claim 1, wherein
  the connecting unit transmits the second identification information to the first communication apparatus;
  when the first communication apparatus receives the second identification information, the first communication apparatus transmits a request, to which the second identification information is added as a header specific to the predetermined data communication protocol, to the second communication apparatus using the communication path; and
  the second communication apparatus obtains the second identification information by receiving the request from the first communication apparatus.

6. A communication control method comprising:
  establishing a connection to a first communication apparatus carrying out data communication, using a predetermined data communication protocol, and via a communication network, where a session is managed by a predetermined session management protocol;
  managing a storing unit storing first identification information about the first communication apparatus used by a user who is authorized to use the communication network;
  carrying out data communication with a second communication apparatus using the predetermined data communication protocol via the communication network;
  when receiving a session start instruction from the first communication apparatus, assigning second identification information about a session corresponding to the session start instruction if the first identification information in the session start instruction is stored in the storing unit;
  associating the second identification information with the first identification information;
  registering the first and second identification information in a connecting unit;
  establishing a communication path to the first communication apparatus in accordance with the session start instruction;
  when receiving the second identification information from the second communication apparatus, confirming whether the first identification information associated with the second identification information is registered in the connecting unit; and,
  notifying the second communication apparatus if the first identification information associated with the second identification information is registered in the connecting unit.

7. The communication control method according to claim 6, further comprising:
  storing user information about the first communication apparatus; and,
  associating the second identification information with the user information,
  wherein the notifying comprises, when the first identification information associated with the second information is registered in the connecting unit, acquiring the user information and transmitting the user information to the second communication apparatus.

8. The communication control method according to claim 7, further comprising storing a selection condition for selecting the user information to be transmitted to the second communication apparatus,
  wherein the notifying comprises selecting the user information to be provided from among the user information that has been stored, based on the selection condition, and transmitting to the second communication apparatus the user information to be provided.

9. The communication control method according to claim 8, wherein the selection condition is set by a user of the first communication apparatus, a user of the second communication apparatus, or the user of the first communication apparatus and the user of the second communication apparatus.

10. The communication control method according to claim 6, further comprising transmitting the second identification information to the first communication apparatus; wherein
  upon receiving the second identification information, the first communication apparatus transmits a request, to which the second identification information is added as a header specific to the predetermined data communication protocol, to the second communication apparatus using the communication path; and
  the second communication apparatus obtains the second identification information by receiving the request from the first communication apparatus.

* * * * *